United States Patent
Eadon et al.

(10) Patent No.: US 10,360,209 B2
(45) Date of Patent: Jul. 23, 2019

(54) HIGHLY SELECTIVE INVALIDATION OF DATABASE CURSORS

(71) Applicant: Oracle International Corporation, Redwood Shores, CA (US)

(72) Inventors: George Eadon, Hollis, NH (US); Ananth Raghavan, San Francisco, CA (US); Ramesh Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 15/267,118

(22) Filed: Sep. 15, 2016

(65) Prior Publication Data

US 2017/0116253 A1   Apr. 27, 2017

Related U.S. Application Data

(60) Provisional application No. 62/244,671, filed on Oct. 21, 2015.

(51) Int. Cl.
*G06F 16/00*     (2019.01)
*G06F 16/2452*   (2019.01)
*G06F 16/2453*   (2019.01)

(52) U.S. Cl.
CPC .... *G06F 16/24524* (2019.01); *G06F 16/2453* (2019.01); *G06F 16/2454* (2019.01)

(58) Field of Classification Search
None
See application file for complete search history.

(56) References Cited

U.S. PATENT DOCUMENTS

| 5,802,523 | A  | * | 9/1998 | Jasuja ............... G06F 17/3041 |
| 6,892,205 | B1 |   | 5/2005 | Colrain et al. |
| 7,251,657 | B2 |   | 7/2007 | Saha et al. |

(Continued)

OTHER PUBLICATIONS

Soorma et al., "Why do my execution plan not change after gathering statistics?—A look at rolling cursor invalidations", posted Sep. 21, 2012, Oracle DBA Tips and Techniques, pp. 1-10 (Year: 2012).*

(Continued)

*Primary Examiner* — Alexander Khong
(74) *Attorney, Agent, or Firm* — Vista IP Law Group, LLP

(57) ABSTRACT

A method commences upon receiving a database language statement pertaining to a database comprising database objects that are accessed by computing processes. The method analyzes the database language statement to form or identify a cursor object that has dependencies on one or more referenced data objects. The cursor object is associated with a set of cursor attributes that are stored in a cursor metadata data structure. By analyzing a subsequently-received database language statement, the method determines one or more operations to operate over at least one of the data objects. Rules are applied to the cursor attributes and/or to the operations and/or to objects referenced in the cursor so as to determine whether or not to invalidate the cursor object. The cursor may be considered at a later time for possible later invalidation or revalidation based on processing of later received database language statements and/or based on a later event.

20 Claims, 12 Drawing Sheets

(56) References Cited

U.S. PATENT DOCUMENTS

| | | |
|---|---|---|
| 7,984,042 B2 | 7/2011 | Colrain et al. |
| 8,140,493 B2 | 3/2012 | Waddington et al. |
| 8,200,658 B2 | 6/2012 | Colrain et al. |
| 2005/0171945 A1* | 8/2005 | Colrain ............. G06F 17/30433 |
| 2008/0313623 A1* | 12/2008 | Waddington ...... G06F 17/30477 717/162 |
| 2013/0060795 A1* | 3/2013 | Plasek ............... G06F 17/30448 707/755 |
| 2016/0342652 A1* | 11/2016 | Baranczyk ........ G06F 17/30463 |
| 2016/0350348 A1* | 12/2016 | Mielenhausen ... G06F 17/30292 |

OTHER PUBLICATIONS

"Iterator", Wikipedia, URL: https://en.wikipedia.org/wiki/Iterator, Dec. 2015.

"What is iterator invalidation?", Stackoverflow.com, URL:http://stackoverflow.com/questions/16904454/what-is-iterator-invalidation, Jun. 2013.

* cited by examiner

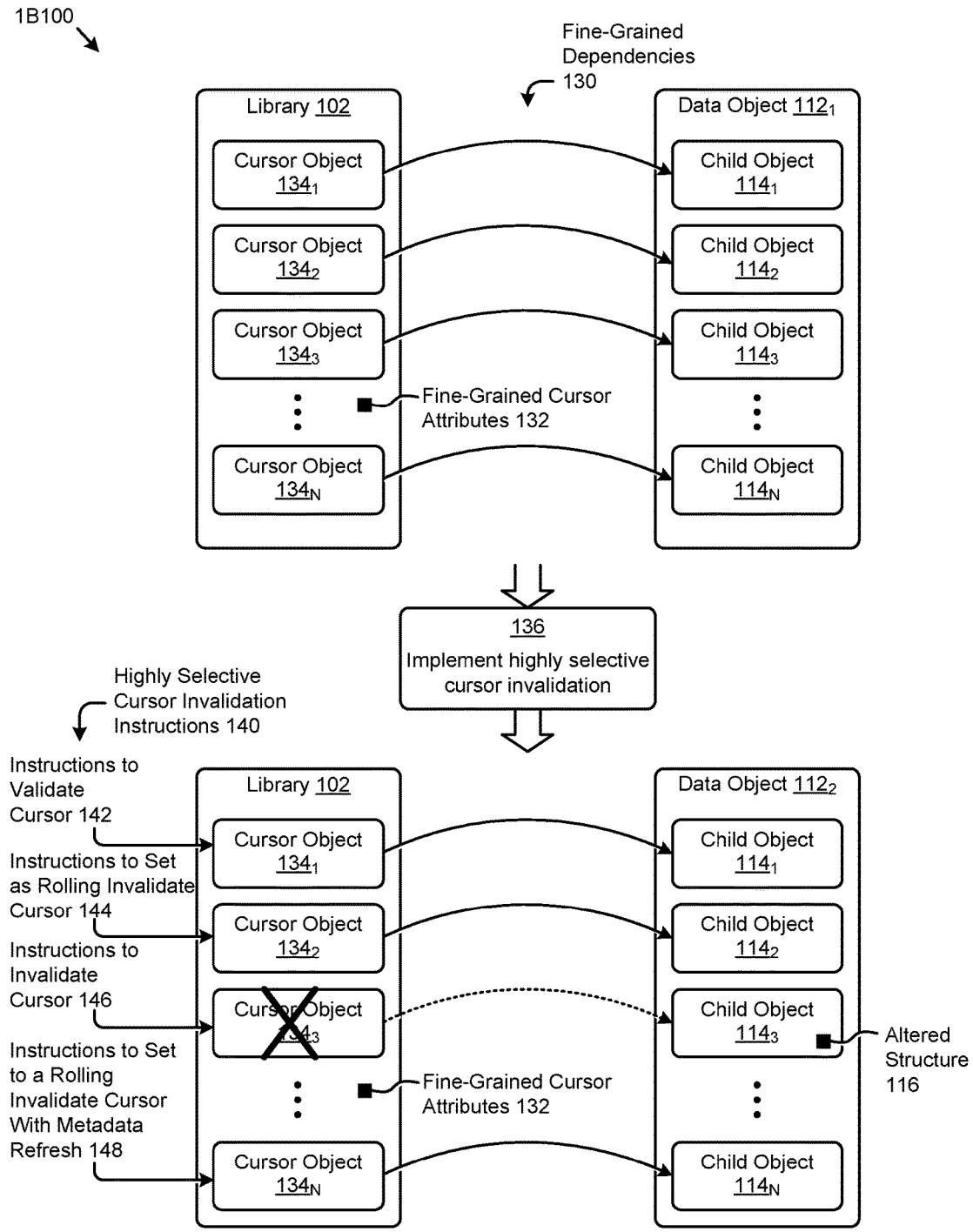
FIG. 1B1

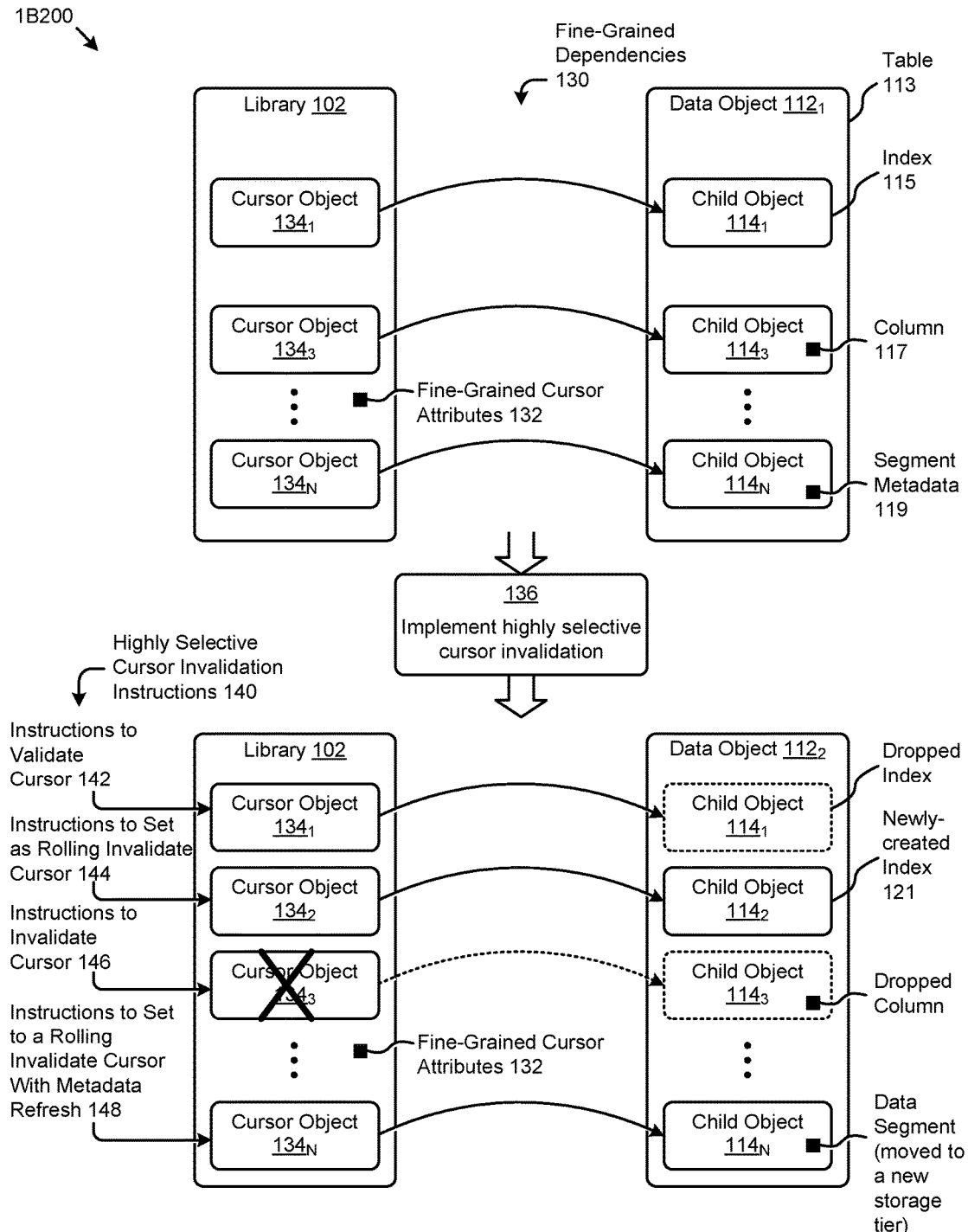
FIG. 1B2

HIGHLY SELECTIVE INVALIDATION OF DATABASE CURSORS

RELATED APPLICATIONS

This application claims the benefit of U.S. Provisional Application No. 62/244,671, filed Oct. 21, 2015, titled "FINE-GRAINED INVALIDATION OF DATABASE CURSORS", which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to managing very large databases, and more particularly to techniques for implementing highly selective cursor invalidation.

BACKGROUND

Today's enterprises often deploy mission-critical databases that can comprise several hundred gigabytes, and sometimes several terabytes of data. Enterprise database administrators can be challenged to maintain and/or improve certain performance characteristics of such very large databases (VLDB). For example, as the volume of data and/or the number of concurrent clients and/or users of the VLDB increase, the response time for completing a specified workload (e.g., database statement execution) and/or the throughput for completing a certain amount of work in a given time period can decrease. To mitigate such performance decreases, certain database implementations can comprise query planners that can generate a set of database operations (e.g., query plan) for a given database statement (e.g., data manipulation language (DML) statements) that are configured for performance (e.g., minimized response time).

Further, such database implementations can support the generation and use of cursors that represent the set of high performance database operations (e.g., execution plan) associated with a previously issued database statement. In such cases, if a new database statement is issued that matches an existing cursor, the high performance cursor can be used without undergoing the costly process of re-compiling and/or re-planning the database operations for the new database statement. Such cursors can continue to be valid for use in the foregoing manner as long as certain aspects of the data objects (e.g., tables, partitions, etc.) referenced by the cursors remain unaltered. Certain data structure alterations pertaining to such cursor dependencies might precipitate an invalidation of the cursor. For example, such data structure operations as might be invoked by various DDL statements can cause invalidation of the cursor.

Unfortunately, legacy techniques for invalidating cursors unnecessarily invalidate cursors. Legacy approaches implement a "course-grained" cursor invalidation technique that can invalidate all cursors having a dependency on a given data object that has been altered (e.g., as a result of performance of a DDL statement or portion thereof). In this legacy approach, multiple cursors (e.g., all cursors that have a dependency the given data object) are invalidated—including some that might not be impacted by the alteration.

In such cases, the coarse-grained invalidation can precipitate a costly recompile of the cursor that might have been avoided. Further, this legacy approach can cause client application brownout and/or performance problems since one DDL statement can precipitate a costly recompile of multiple cursors used by the application. In such cases, the application might remain unavailable until the cursors are recompiled. Other legacy approaches might delay the recompile of invalidated cursors to a randomly selected moment in time in a rolling invalidation technique. While such rolling invalidation techniques might spread the recompile workload over time, valuable resources are consumed by recompiling cursors that may already be valid even without recompilation.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

FIG. 1B1 and FIG. 1B2 illustrate highly selective cursor invalidation techniques as implemented in systems that support highly selective cursor invalidation based on fine-grained cursor attributes, according to some embodiments.

DETAILED DESCRIPTION

Figure 1A:
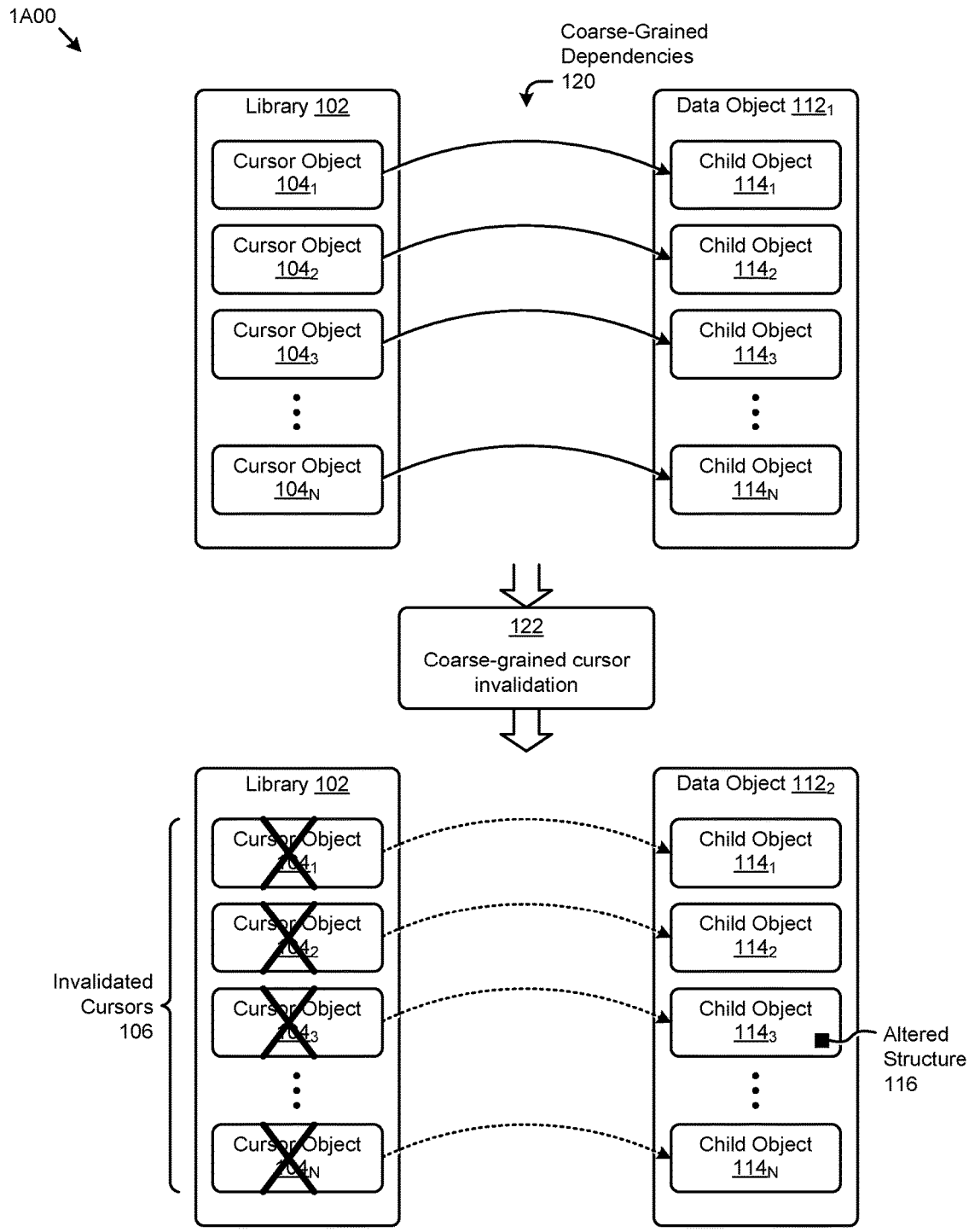
FIG. 1A illustrates a coarse-grained cursor invalidation technique.

Some embodiments of the present disclosure address the problem of database performance degradation that results from unnecessary cursor invalidation. Some embodiments are directed to approaches to annotate cursor metadata with an extended set of attributes that facilitate selectively invalidating cursors based on fine-grained cursor invalidation rules. The accompanying figures and discussions herein present example environments, systems, methods, and computer program products.

Overview

When database operations (e.g., queries) are processed by a database system, a (possibly) significant amount of processing might be incurred as a result of database statement compilation and optimization. Often the results of compilation and optimization are sometimes stored in or with a data structure referred to as "cursors". Cursors or cursor object metadata comprise pointers to other data structures and/or pointers to database objects that might be used in execution of the cursor's respective database statement. Cursors, more specifically cursor metadata within the aforementioned data structures are maintained over an indeterminate amount of time. Inasmuch as cursors point to or otherwise represent objects in the database, it is possible than cursor metadata that was valid at some earlier moment in time becomes invalidated by virtue of invalidating changes in the pointed-to database objects. However, not all changes in the pointed-to database objects necessarily affect the cursor in an invalidating manner. In some cases, a set of operations associated with the cursor (e.g., an execution plan for its respective database statement) might be equally as valid and/or optimal after the pointed-to database object had changed as it was valid and/or optimal before the pointed-to database object had changed. Observations of how cursors are only partially invalidated and/or not invalidated at all even in the presence of a change in the pointed-to database object(s) serve to precipitate the herein-disclosed techniques that annotate cursor metadata with fine-grained attributes so as to facilitate only selectively invalidating cursors and/or their metadata (or not invalidating at all) based on a set of respective cursor invalidation rules associated with database operations that involve the cursor. Specifically, in some embodiments, a set of extended (e.g., fine-grained) cursor attributes can characterize certain dependencies and/or other aspects of the cursors that can be applied to a set of cursor invalidation rules associated with an issued data definition language statement (e.g., DDL statement). In certain embodiments, applying the cursor attributes to the cursor invalidation rules can produce multiple possible outcomes.

A set of cursor invalidation instructions can be generated for a given cursor to perform highly selective actions pertaining to cursor invalidation such as: (1) validate cursor (e.g. if cursor does full table scan and an index on the table is altered), (2) invalidate cursor (e.g. if a column accessed by the cursor is dropped from the table), (3) mark as rolling invalidate cursor (e.g., cursor is marked as valid but has a sub-optimal plan), or (4) mark as rolling invalidate cursor with metadata refresh (e.g., the cursor is marked as valid but needs some metadata to be updated for accuracy, such as if a data segment had been moved to a new storage device). In various embodiments, certain cursor attributes (e.g., flags) can be set to facilitate processing of the cursors according to the generated cursor invalidation instructions or rules.

As further examples, consider a table T that is partitioned by date with 3 partitions: partition #1 for data from year 2013, partition #2 for data from year 2014, and partition #3 for data from year 2015. Further consider a SELECT cursor that references table T. This cursor uses segment metadata used to locate the data in each partition. In legacy approaches, a MOVE PARTITION statement that moves partition #1 to a lower cost archival storage tier would invalidate this SELECT cursor in entirety. However, fine-grained invalidation serves to invalidate only the segment metadata while the remainder of the cursor (e.g. execution plan) remains valid. When executing this cursor after such fine-grained invalidation, the segment metadata would be refreshed, and thus a retrieval operation would access partition #1 on the aforementioned lower cost archival storage tier.

As another example, in accordance with legacy approaches, a SELECT cursor comprising a full table scan operation on table T1 (e.g., TABLE ACCESS FULL T1) would be invalidated in response to a DROP INDEX statement that drops an index on table T1 due to the alteration (e.g., index drop) associated with the data object (e.g., table T1). In legacy approaches, the SELECT cursor would be unnecessarily invalidated (e.g., due to being based on a coarse-grained invalidation rule that merely calculates object dependency.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

FIG. 1A illustrates a coarse-grained cursor invalidation technique 1A00.

Specifically, FIG. 1A depicts a data object $112_1$ associated with various child objects (e.g., child object $114_1$, child object $114_2$, child object $114_3$, . . . , child object $114_N$). For example, the data object $112_1$ might correspond to data organized in a database table with child objects comprising various indexes, partitions, and/or other data object structures. To facilitate efficient execution of database statements (e.g., queries) pertaining to the data object $112_1$ and/or its child objects, a database system can generate various cursors comprising certain data manipulation operations that can be optimized (e.g., for minimal query response times) for execution when database statements comprising the foregoing data manipulation operations are issued. Cursors can be maintained in the database system as cursor objects. Cursor objects are data structures that comprise a pointer that points to a pre-allocated memory location (e.g., in a shared global area). A cursor object can be associated with a particular database statement or portion thereof. Moreover a cursor object can comprise or point to metadata that itself refers to any one or more aspects of a database statement. The metadata pointed to by a cursor object can be stored in a computer memory within a cursor metadata data structure, possibly in a shared global area, or in a cache area such as a library cache.

As shown in FIG. 1A, a representative set of cursors (e.g., cursor object $104_1$, cursor object $104_2$, cursor object $104_3$, . . . , cursor object $104_N$) can be stored in a library cache 102 of the instance of the database system. As further shown, the cursor objects can have dependencies on the data object $112_1$ and/or its child objects corresponding to the object references comprising the data manipulation operations of each cursor object. Specifically, in certain approaches, such dependencies might comprise a set of coarse-grained dependencies 120. As an example, while cursor object $104_2$ might be a SELECT cursor comprising a full table scan operation on the data object $112_1$ (e.g., table T1), certain data definition operations merely on one or more of the child objects might result in an unnecessary invalidation of the cursor object $104_2$ and/or other cursor objects.

Specifically, certain approaches can implement a coarse-grained cursor invalidation (step 122) responsive to an altered structure 116 associated with child object $114_3$ can result in the invalidation of any cursor objects referencing the child object $114_3$ or any objects associated with the parent data object (e.g., data object $112_2$). More specifically, the shown cursor objects in the library cache 102 might all be invalidated (e.g., see the invalidated cursors 106). For example, the altered structure 116 might correspond to a data definition statement (e.g., DDL statement) comprising a DROP INDEX operation that drops the child object $114_3$ (e.g., an index on table T1) from the data object $112_2$ (e.g., table T1). In this case, while invalidating cursor objects (e.g., cursor object $104_3$) dependent on the index (e.g., child object $114_3$) might be appropriate, other cursor objects associated with the data object $112_2$ might not need to be invalidated. For example, the earlier mentioned example of cursor object $104_2$ representing a SELECT cursor comprising a full table scan operation (e.g., TABLE ACCESS FULL T1) on the data object $112_1$, (e.g., table T1), the cursor object $104_2$ would remain valid to execute even following the DROP INDEX alteration.

In some legacy approaches (e.g., coarse-grained cursor invalidation technique 1A00), the coarse-grained cursor invalidation can precipitate a costly recompile of multiple cursors. In some cases, and as discussed herein such coarse-grained cursor invalidation can be avoided. Legacy approaches can cause client application brown-outs and/or performance problems since one DDL statement can precipitate an invalidation and forced recompile of multiple cursors (e.g., invalidated cursors 106) used by the application. In such cases, the application can appear to be non-responsive until the cursors are recompiled. The foregoing problems attendant to database performance degradation precipitated by cursor invalidation can be addressed by the herein disclosed techniques as described in FIGS. 1B1 and 1B2.

FIG. 1B1 illustrates a fine-grained cursor invalidation techniques 1B100 as implemented in systems that support highly selective cursor invalidation based on fine-grained cursor attributes. As an option, one or more variations of fine-grained cursor invalidation technique 1B100 or any aspect thereof may be implemented in the context of the architecture and functionality of the embodiments described herein. The fine-grained cursor invalidation technique 1B100 or any aspect thereof may be implemented in any environment.

Specifically, FIG. 1B1 depicts the data object $112_1$ and its various child objects (e.g., child object $114_1$, child object $114_2$, child object $114_3$, . . . , child object $114_N$) earlier described. As further shown in FIG. 1B, a representative set of cursors (e.g., cursor object $134_1$, cursor object $134_2$, cursor object $134_3$, . . . , cursor object $134_N$) generated according to the herein disclosed techniques can be stored in the library cache 102. Specifically, any of the cursor objects in FIG. 1B1 can have a respective set of fine-grained dependencies 130 on the data object $112_1$. Its child objects can be characterized by fine-grained cursor attributes 132 that can be stored in or with the child objects or can be stored elsewhere and merely referenced by the child objects. For example, the fine-grained cursor attributes 132 might describe a set of low order details pertaining to the dependencies, the data object structures (e.g., segments, partitions, etc.), various invalidation statistics, and/or other cursor object characteristics to facilitate the implementation of a highly selective cursor invalidation as shown (operation 136).

Specifically, according to the herein disclosed techniques, the fine-grained cursor attributes 132 can be applied to a set of cursor invalidation rules associated with various data definition operations to determine a set of highly selective cursor invalidation instructions 140 to execute for each cursor object associated with the data definition operations. For example, a certain data definition statement (e.g., DDL statement) might be issued to generate the altered structure 116 of child object $114_3$. Certain cursor invalidation rules associated with the DDL statement can be applied to any selected cursors associated with the DDL statement to determine the cursor invalidation instructions for each of the selected cursors. More specifically, the highly selective cursor invalidation instructions 140 generated for a given cursor can perform highly selective actions pertaining to cursor invalidation such as a validate cursor 142 action, a rolling invalidate cursor 144 action, an invalidate cursor 146 action, a rolling invalidate cursor with metadata refresh 148 action, and/or other actions.

As an example case resulting in the validate cursor 142 action, a SELECT cursor referencing column colA of table T1 would remain valid following a data definition statement to alter a column not referenced by the cursor (e.g., "ALTER TABLE T1 SET UNUSED COLUMN colB". An example resulting in the rolling invalidate cursor 144 action, a SELECT cursor referencing column colA of table T1 would remain valid but with a sub-optimal plan following a data definition statement to create a new index on column colA of table T1 (e.g., "CREATE INDEX I on T1 (colA)"). Also, an example resulting in the invalidate cursor 146 action, a SELECT cursor referencing an index I3 of table T1 would be invalidated following a data definition statement to drop index I3 (e.g., "DROP INDEX I3"). Further, an example resulting in the rolling invalidate cursor with metadata refresh 148 action, a SELECT cursor referencing table T1 would be invalidated following a data definition statement to move a table T1 or a partition of table T1 (e.g., "ALTER TABLE T1 MOVE PARTITION P1").

FIG. 1B2 illustrates fine-grained cursor invalidation techniques 1B200 as implemented in systems that support highly selective cursor invalidation based on fine-grained cursor attributes. As an option, one or more variations of fine-grained cursor invalidation techniques 1B200 or any aspect thereof may be implemented in the context of the architecture and functionality of the embodiments described herein. The fine-grained cursor invalidation techniques 1B200 or any aspect thereof may be implemented in any environment.

The shown fine-grained cursor invalidation techniques 1B200 depict specific situations where the fine-grained cursor invalidation techniques are applied. The top portion of FIG. 1B2 depicts cursor objects that reference specific types of child objects. The bottom portion of FIG. 1B2 depicts how fine-grained dependencies 130 are applied to those specific types of child objects. Moreover the bottom portion of FIG. 1B2 depicts the state of the child objects after application of a corresponding fine-grained cursor invalidation technique. As shown, the application of highly-selective invalidation rules serves to eliminate unnecessary invalidation and/or to delay invalidation of the cursor at least until such time as the cursor of portion thereof is invalidated by encountering an invalidating operation or encountering an invalidating event. Such an invalidating operation or invalidating event might be raised by receipt and/or processing (e.g., compilation, optimization) of another later-encountered database language statement that pertains to the database and/or child objects therein.

The shown examples include objects pertaining to a table 113. Specifically the table 113 comprises an index 115, a column 117, and segment metadata 119. In the event of an alteration of table 113, rather than invalidate the SELECT cursors that refer to table 113, operation 136 serves to implement highly-selective cursor invalidation. More specifically, highly-selective cursor invalidation instructions are associated with a particular cursor object. The examples include an example to validate the cursor when an index is dropped. As shown, merely dropping an index does not need to invalidate the cursor that refers to the dropped index. The examples further include an example to apply instructions to establish the cursor to undergo a rolling invalidation. As shown, in the example resulting in the rolling invalidate cursor 144 action, a SELECT cursor referencing column colA of table T1 would remain valid but with a sub-optimal plan following a data definition statement to create a new index on column colA of table T1 (e.g., "CREATE INDEX I on T1 (colA)"). As shown child object $114_2$ subsumes a newly-created index 121. Continuing if a data definition statement were processed so as to drop a column (e.g., column 117) of table 113, then that cursor becomes associated with instructions to invalidate the cursor. The existence of and/or contents of child object $114_3$ would become moot.

Still continuing with these examples, in the event that a segment of a table is altered by operation of movement of the segment to another storage location, the entire cursor need not be invalidated merely on the basis of the segment movement. Instead, the cursor becomes associated with instructions to update the cursor with refreshed metadata (e.g., to reflect the new location of the moved segment).

Figure 2A:
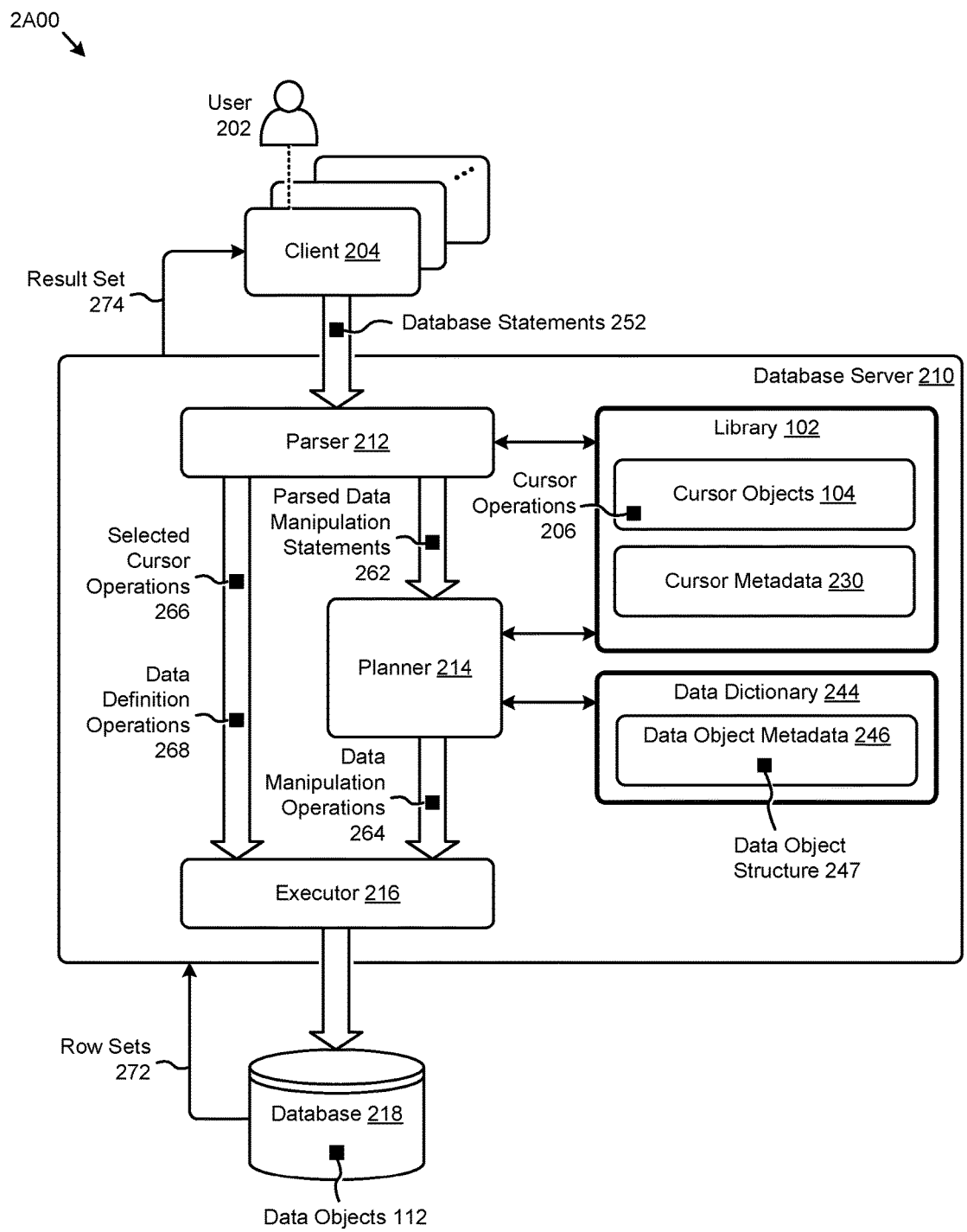
FIG. 2A presents a block diagram of a system for implementing cursor invalidation based on fine-grained cursor attributes, according to an embodiment.

An environment for implementing the foregoing cursor invalidation techniques and/or other herein disclosed techniques is described in FIG. 2A.

FIG. 2A presents a block diagram of a system 2A00 for implementing cursor invalidation based on fine-grained cursor attributes. As an option, one or more variations of system 2A00 or any aspect thereof may be implemented in the context of the architecture and functionality of the embodiments described herein. The system 2A00 or any aspect thereof may be implemented in any environment.

The embodiment shown in FIG. 2A is merely one example of a database access environment that can implement the herein disclosed techniques. Specifically, an implementation of a database system might comprise a database server 210 that interfaces with a database 218 to facilitate access to certain instances of data objects 112. More specifically, multiple users (e.g., user 202) might use various instances of a client 204 (e.g., data analysis application) to issue various instances of database statements 252 (e.g., SQL queries) to the database server 210 that can generate a collection of row sets 272 comprising a result set 274. The database server 210 can process the database statements 252 using various components such as a parser 212, a planner 214, an executor 216, a library cache 102, a data dictionary 244, and/or other components.

More specifically, the database statements 252 might be received at the parser 212 to perform various operations on the database statements 252. For example, the parser 212 can parse the database statements 252 to perform a syntax check, a semantics check, and/or other checks of the database statements 252. The parser 212 can further distinguish data definition statements (e.g., DDL statements) from data manipulation statements (e.g., DML statements). When DDL statements are detected, the parser 212 can perform a "hard parse" of the received statements to generate a set of data definition operations 268 for the executor 216 to issue on the database 218. When DML statements are detected, the parser 212 can check the library cache 102 for any of the cursor objects 104 that match the DML statements. The cursor objects 104 can comprise executable forms of cursor operations 206 corresponding to earlier issued DML, statements. As an example, the database server 210 might use a hashing algorithm to generate a hash value for every parsed DML statement representation that can be stored in a set of cursor metadata 230 to identify cursor objects that match the currently issued DML statements. If the parsed representation of the DML statement exists in the library cache 102 (e.g., and it can be shared with the user 202), the parser 212 can deliver the selected cursor operations 266 to the executor 216 for operation on the database 218. Such cases can be referred to as a "soft parse" or a "library cache hit".

If no matching cursor from the cursor objects 104 is discovered, the parsed data manipulation statements 262 can be delivered to the planner 214 to generate a set of data manipulation operations 264 to deliver to the executor 216 for operation on the database 218. Such cases can be referred to as a "hard parse" or a "library cache miss". During such hard parses, the planner 214 can access the library cache 102 and a data dictionary 244 numerous times. For example, the planner 214 might frequently access the data object metadata 246 in the data dictionary to determine the data object structure 247 of the data objects 112 referenced in the parsed data manipulation statements 262.

The planner 214 can use the foregoing information and/or other information (e.g., access paths, hints, etc.) to determine a set of potential plans (e.g., physical plans comprising data manipulation operations) for the parsed data manipulation statements 262 (e.g., SQL statements). The potential plans can be analyzed at the planner 214 to determine a "best" potential plan (e.g., "best" as pertains to some statistical criterion) comprising a set of data manipulation operations 264 that are delivered to the executor 216. For example, the planner 214 might use an estimate of the cost of each potential plan to determine a best or optimal plan. Specifically, such costs might correspond to the resources that might be expected to be used to execute the operations comprising a given plan. In some cases, cost estimates might be derived from statistics collected in the data dictionary 244. Executable plans generated (e.g., constructed and compiled) by the planner 214 can then be saved as cursor objects in the library cache 102 for reuse at some later moment in time.

The time and/or computing costs associated with a hard parse can be significant. Specifically, using an existing cursor object in a soft parse scenario is preferable in terms of performance and/or resource usage since the plan generation steps and/or other steps (e.g., row source generation steps) can be avoided. In coarse-grained cursor invalidation approaches to cursor invalidation various cursors might be invalidated unnecessarily. Such coarse-grained cursor invalidation approaches can precipitate a costly recompile of multiple cursors that might have been avoided. The foregoing problems attendant to database performance degradation precipitated by cursor invalidation in an environment such as depicted in FIG. 2A can be addressed by the herein disclosed techniques as described in FIG. 2B.

Figure 2B:
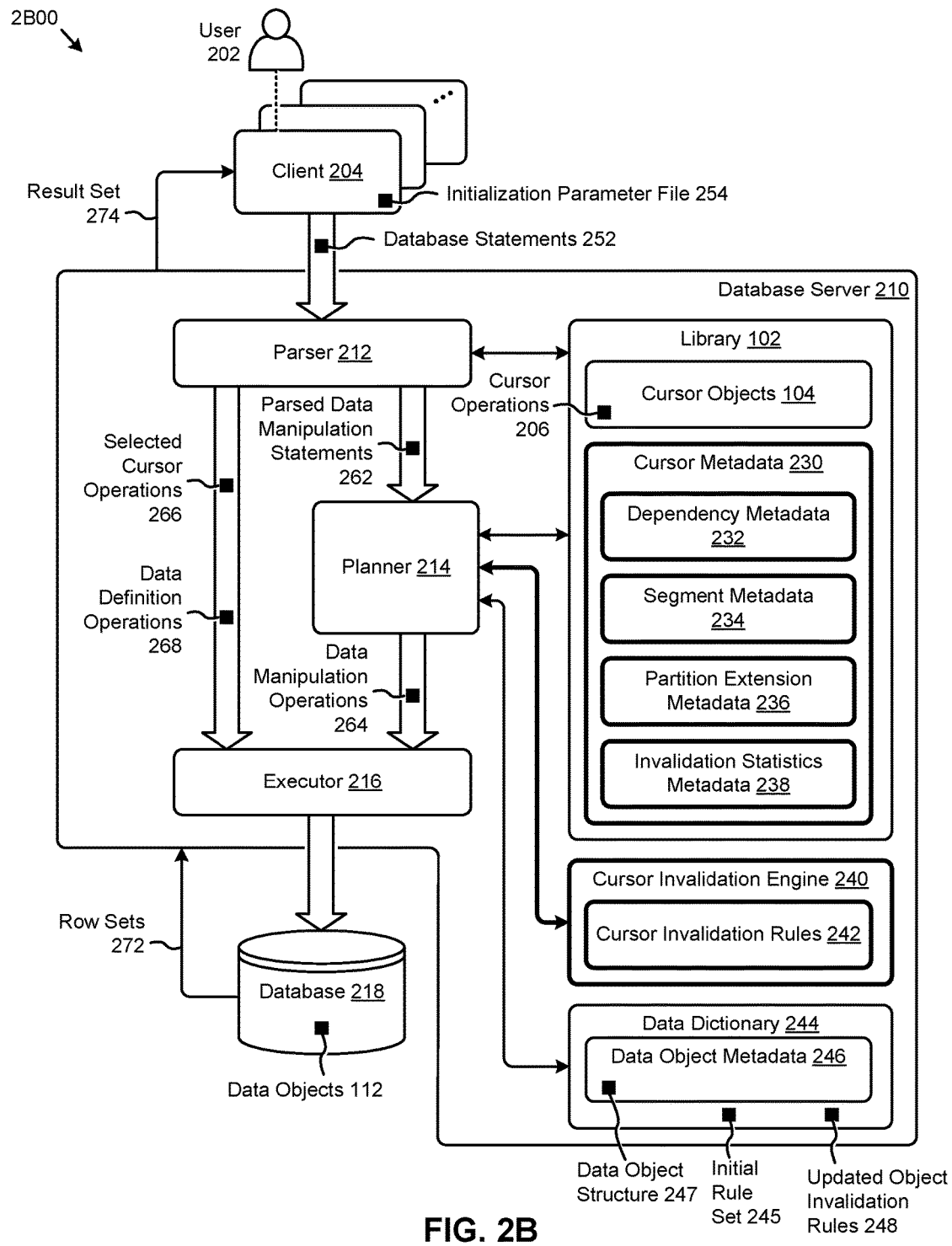
FIG. 2B presents a block diagram of a highly selective cursor invalidation system based on fine-grained cursor attributes, according to an embodiment.

FIG. 2B presents a block diagram of a highly selective cursor invalidation system 2B00. As an option, one or more variations of the highly selective cursor invalidation system 2B00 or any aspect thereof may be implemented in the context of the architecture and functionality of the embodiments described herein. The highly selective cursor invalidation system 2B00 or any aspect thereof may be implemented in any environment.

The embodiment shown in FIG. 2B presents the components, data flows, and/or other aspects of the environment described FIG. 2A, and further illustrates various other components, data flows, and/or other aspects pertaining to the herein disclosed techniques for highly selective cursor invalidation based on fine-grained cursor attributes. Specifically, as earlier described in FIG. 2A, the database server 210 can interface with the database 218 to facilitate access to the data objects 112 by the client 204 operated by user 202. In some embodiments, the database server 210 can comprise the parser 212, the planner 214, the executor 216, the library cache 102, and the data dictionary 244. The library cache 102 can contain, in part, the cursor objects 104 comprising cursor operations 206 and characterized by the cursor metadata 230. The data dictionary 244 can also comprise the data object metadata 246 characterizing, for example, the data object structure 247 of certain instances of the data objects 112. The database server 210 might be used to receive the database statements 252 (e.g., SQL queries) from the client 204 to generate a collection of row sets 272 comprising the result set 274. In some cases, the database statements 252 can be soft parsed to determine a set of selected cursor operations 266 to operate on the database 218. In other cases, the database statements 252 can be hard parsed into a set of parsed data manipulation statements 262 to be used by the planner 214 to generate a set of data manipulation operations 264 to operate on the database 218. Further, the database statements 252 might produce a set of data definition operations 268 (e.g., hard parsed) to operate on the database 218.

The database server 210 further comprises various other components, data flows, and/or other aspects to facilitate highly selective cursor invalidation based on fine-grained cursor attributes according to the herein disclosed techniques. Specifically, a set of fine-grained cursor attributes can be included in the cursor metadata 230. For example, a set of dependency metadata 232, a set of segment metadata 234, a set of partitioning extension metadata 236, a set of invalidation statistics metadata 238, and/or other sets of metadata can be included in the cursor metadata to facilitate the herein disclosed techniques. Further, the database server 210 can comprise a cursor invalidation engine 240 that can access a set of cursor invalidation rules 242.

For example, the cursor invalidation rules 242 might comprise attributes and/or operators that correspond to certain instances of the data definition operations 268 and/or certain types of the cursor objects 104. In this case, the cursor invalidation engine 240 can apply the cursor invalidation rules 242 to selected instances of the cursor objects 104 that have a dependency on any of the data objects 112 (e.g., and/or child objects of the data objects 112) updated by the data definition operations 268 to determine a set of highly selective cursor invalidation instructions for each of the selected cursors. In some cases, a set of updated object invalidation rules 248 can be registered with the updated object in the data object metadata 246 in the data dictionary 244. Any rule set (e.g., initial rule set 245) can be stored in any storage area accessible to the database server.

Such rules-based highly selective cursor invalidation can address the problems attendant to database performance degradation precipitated by cursor invalidation. Specifically, the herein disclosed techniques can avoid unnecessary invalidation of cursors not impacted by certain database alterations. Further, cursors that merely have a sub-optimal plan resulting from a database alteration can remain valid, but have a recompile scheduled at a selected time (e.g., a randomly selected time, a cursor start time, etc.). In some cases, a database alteration might merely precipitate a metadata update (e.g., refresh) of the cursor metadata, whereas in legacy approaches that cursor might have been invalidated.

Certain attributes and/or settings in an initialization parameter file 254 at the client 204 and/or certain clauses in the database statements 252 can further facilitate the herein disclosed techniques (e.g., see discussion pertaining to FIG.

4). The herein disclosed techniques can further be facilitated by use of the fine-grained cursor attributes comprising the cursor metadata 230 and/or by certain attributes corresponding to the cursor invalidation rules 242, as described in FIG. 3.

Figure 3:
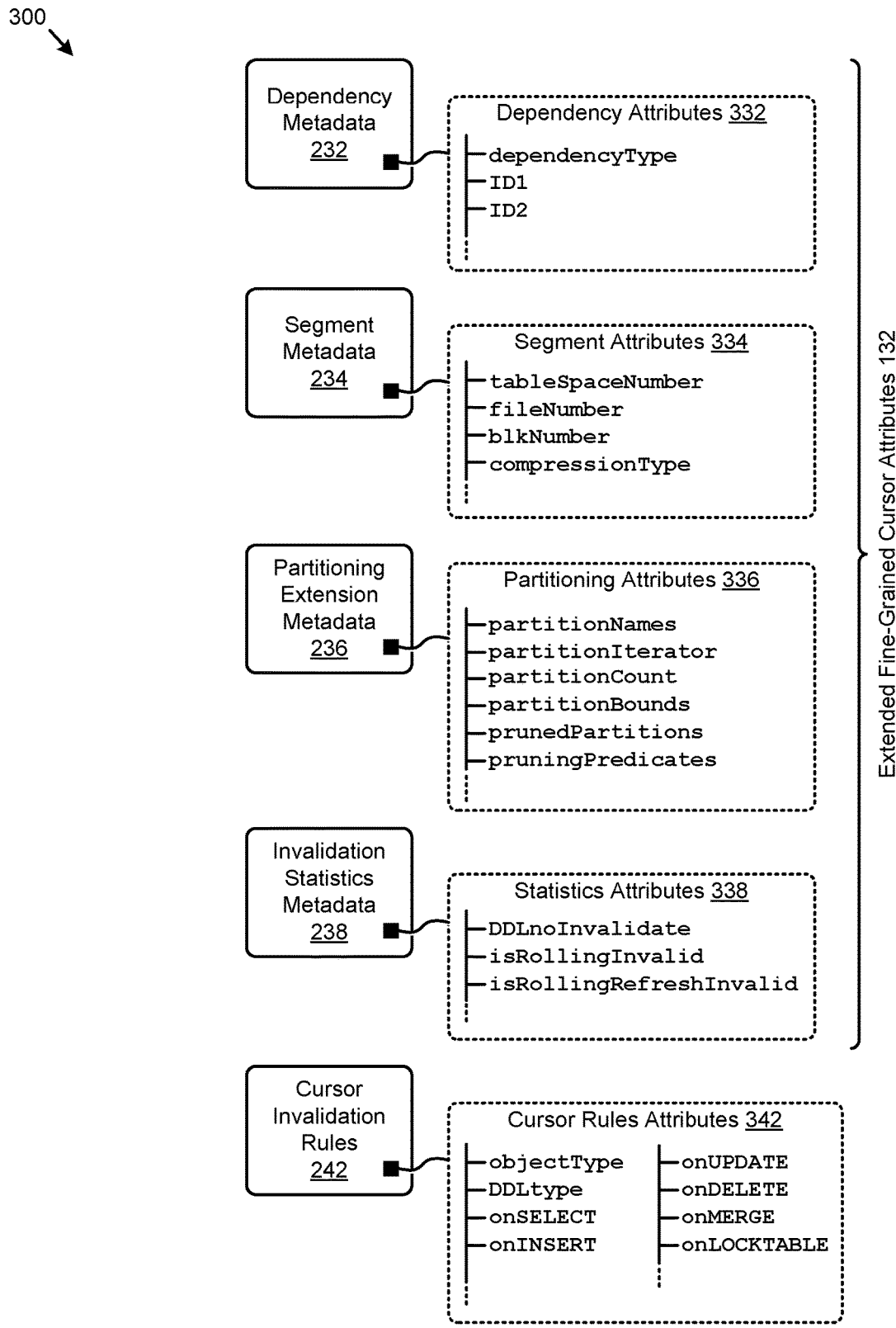
FIG. 3 depicts data structures for use in systems that implement highly selective cursor invalidation based on fine-grained cursor attributes, according to an embodiment.

FIG. 3 depicts data structures 300 for use in systems that implement highly selective cursor invalidation based on fine-grained cursor attributes. As an option, one or more variations of data structures 300 or any aspect thereof may be implemented in the context of the architecture and functionality of the embodiments described herein. The data structures 300 or any aspect thereof may be implemented in any environment.

FIG. 3 depicts certain attributes of the data structures 300 pertaining to the containers (e.g., dependency metadata 232, segment metadata 234, partitioning extension metadata 236, and invalidation statistics metadata 238) comprising the fine-grained cursor attributes 132. The data structures 300 further illustrate certain attributes pertaining to the cursor invalidation rules 242. In some embodiments, the shown attributes might correspond to columns in a relational database table.

Specifically, the dependency metadata 232 might comprise a set of dependency attributes 332 characterizing the one or more dependencies of a given cursor object. For example, the dependency attributes 332 might describe a cursor dependency type or dependencyType (e.g., index, column, expansion, partition predicate, etc.), the identifiers (e.g., ID1, ID2, etc.) associated with the dependency (e.g., <index objN>, <table objN>, <intColN>, etc.), and/or other attributes. The segment attributes 334 might describe the physical attributes of a cursor dependency using attributes such as table space number or t s N, file number or fileN, block number or blkN, compression type or compressionType, and/or other attributes.

Further, the partitioning attributes 336 might describe cursor dependencies and/or associations with various partitioning operations (e.g., detected from partition-extended syntax) using attributes characterizing the use of one or more partition names or partitionNames, a partition iterator setting or partitioniterator, a partition count or partitionCount, partition bounds or partitionBounds, pruned partitions or prunedPartitions, partition pruning predicates detected or pruningPredicates, and/or other attributes.

Certain cursor invalidation statistics can also be captured using the invalidation statistics metadata 238 to facilitate the herein disclosed techniques. Specifically, the statistics attributes 338 might comprise a DDLnoInvalidate attribute to indicate if a referenced data object associated with a cursor has been updated but did not cause an invalidation of the cursor. The statistics attributes 338 might further comprise an isRollingInvalid attribute to indicate a cursor is marked for a rolling invalidation action, and an isRollingRefreshInvalid attribute to indicate a cursor is marked for a rolling invalidation with metadata refresh action. Table 1 below presents example states associated with the statistics attributes 338 that might be codified in the invalidation statistics metadata 238.

TABLE 1

Examples of statistics attributes states

| Attribute | State | Description |
| --- | --- | --- |
| DDLnoInvalidate | N | No DDL statement has updated a dependent data object without invalidating this cursor |
| | Y | A DDL statement updated a dependent data object and did not invalidate this cursor, but the cursor has not executed since the data object update |
| | X | A DDL updated a dependent data object and did not invalidate this cursor, and the cursor has executed since data object update |
| isRollingInvalid | N | This cursor is not rolling invalidated |
| | Y | This cursor is rolling invalidated, but the cursor has not executed in this state |
| | X | This cursor is rolling invalidated, and the cursor has executed in this state |
| isRollingRefreshInvalid | N | This cursor is not rolling invalidated nor does it require execution-time refresh |
| | Y | This cursor is rolling invalidated and needs execution-time refresh, but the cursor has not executed in this state |
| | X | This cursor is rolling invalidated and needs execution-time refresh, and the cursor has executed in this state |

FIG. 3 further shows certain instances of cursor rules attributes 342 associated with the cursor invalidation rules 242. In some cases, the cursor rules attributes 342 might correspond to certain operators associated with a given data definition statement (e.g., DDL statement). In exemplary situations, a cursor having a dependency referenced by the data definition statement that can be applied (e.g., by a cursor invalidation engine) to a set of logic to determine one or more highly selective cursor invalidation instructions. Specifically, the cursor rules attributes 342 might describe an object type or objectType (e.g., index, column, table, constraint, etc.) pertaining to the rule and/or DDL statement, the type of DDL statement or DDLtype (e.g., see Table 2 below), and/or other attributes. The cursor rules attributes 342 might further characterize various cursor types to produce cursor-specific rule outcomes and/or actions (e.g., onSELECT cursor, onINSERT cursor, onUPDATE cursor, onDELETE cursor, onMERGE cursor, onLOCKTABLE cursor, etc.). Table 2 below presents an example set of cursor invalidation rules that can be implemented according to the herein disclosed techniques to produce highly selective cursor invalidation actions and/or instructions.

TABLE 2

Examples of highly selective cursor invalidation rules

| DDLtype | onSELECT | onINSERT, onUPDATE, onDELETE, onMERGE |
|---|---|---|
| CREATE INDEX | Rolling invalidate cursor | Invalidate cursor |
| CREATE INDEX INVISIBLE | Rolling invalidate if using invisible indexes, else validate cursor | Invalidate cursor |
| DROP INDEX | Invalidate cursor if dropped index is used by the query, else rolling invalidate | Invalidate cursor |
| INDEX UNUSABLE | Invalidate cursor if index is used by the query | Invalidate cursor if index is used by the query, or if certain logging is enabled |
| INDEX REBUILD | Rolling invalidate cursor with segment metadata refresh | Rolling invalidate cursor with segment metadata refresh, or invalidate cursor if certain logging is enabled |
| ADD COLUMN | Invalidate cursor if SELECT *, a join, or a PL/SQL function reference is used | Invalidate cursor |
| DROP COLUMN | Invalidate cursor | Invalidate cursor |
| COLUMN SET UNUSED | Invalidate cursor if column is referenced | Invalidate cursor |
| MOVE, TRUNCATE, or EXCHANGE, TABLE or [SUB]PARTITION | Rolling invalidate cursor with segment metadata refresh | Rolling invalidate cursor with segment metadata refresh |
| ADD [SUB]PARTITION | Rolling invalidate cursor with segment and partition metadata refresh | Rolling invalidate cursor with segment and partition metadata refresh |
| DROP [SUB]PARTITION | Invalidate cursor if partition-extended names are used, else rolling invalidate cursor with segment and partition metadata refresh | Invalidate cursor if partition-extended names are used, else rolling invalidate cursor with segment and partition metadata refresh |
| MODIFY DEFAULT ATTRIBUTES | Validate cursor | Validate cursor |
| hash-ADD, COALESCE, SPLIT, MERGE or [SUB]PARTITION | Invalidate cursor if partition-extended names are used, else rolling invalidate cursor with segment and partition metadata refresh | Invalidate cursor |
| ALTER TABLE SHRINK SPACE | Rolling invalidate cursor with segment metadata refresh | Rolling invalidate cursor with segment metadata refresh |
| DROP TABLE | Invalidate cursor | Invalidate cursor |
| ADD, ENABLE CONSTRAINT | Rolling invalidate cursor | Invalidate cursor |
| DROP or DISABLE | Invalidate cursor | Invalidate cursor |

In some cases, the foregoing instances of the fine-grained cursor attributes 132 and/or the cursor rules attributes 342 can be augmented by certain directives (e.g., "hints") from the user and/or client application to facilitate the herein disclosed techniques for highly selective cursor invalidation. An embodiment of a use model implementing such directives is described as pertaining to FIG. 4.

Figure 4:
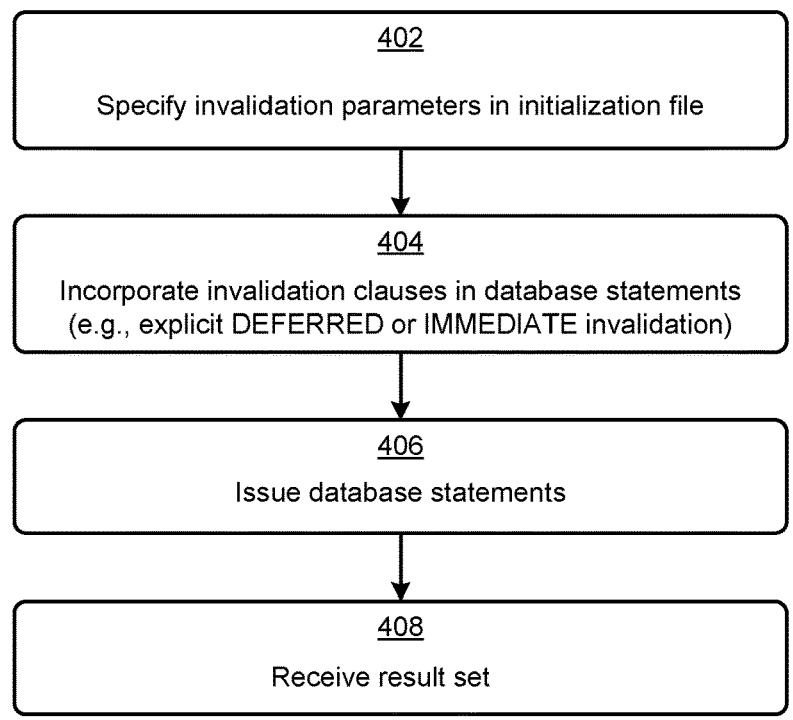
FIG. 4 depicts a use model pertaining to systems that implement highly selective cursor invalidation based on fine-grained cursor attributes, according to an embodiment.

FIG. 4 depicts a use model 400 pertaining to systems that implement highly selective cursor invalidation based on fine-grained cursor attributes. As an option, one or more variations of use model 400 or any aspect thereof may be implemented in the context of the architecture and functionality of the embodiments described herein. The use model 400 or any aspect thereof may be implemented in any environment.

FIG. 4 presents one embodiment of a set of steps and/or operations that can be executed in systems implementing the herein disclosed techniques for highly selective cursor invalidation based on fine-grained cursor attributes. In one or more embodiments, the steps and underlying operations shown in FIG. 4 can be executed by the user 202 at the client 204. Specifically, the use model 400 can commence with the user specifying certain cursor invalidation parameters in an initialization parameter file (e.g., initialization parameter file 254 in FIG. 2B) (step 402). Such an initialization parameter file (or an ALTER SYSTEM or ALTER SESSION command) can be used to establish certain parameters and/or behaviors pertaining to a certain instance of a database system.

For example, a parameter called CURSOR_INVALIDATION might be provided that can have allowable values of IMMEDIATE or DEFERRED. As an example, a CURSOR_INVALIDATION=DEFERRED setting might correspond to performing such highly selective cursor invalidation techniques as described herein. The user might further incorporate certain clauses in issued database statements that provide certain directives pertaining to cursor invalidation (step 404). For example, an optional {DEFERRED|IMMEDIATE} INVALIDATION clause might be inserted into various DDL statements issued by the user. As an example, specifying the foregoing clause in a DDL statement can override the setting in the initialization parameter file. As another example, the clause setting might further override certain rules earlier described. Specifically, adding IMMEDIATE INVALIDATION to a given DDL statement might override a "rolling invalidate cursor" action with an "invalidate cursor" action.

When the user has established the foregoing directives associated with cursor invalidation, the user can then issue one or more database statements (step 406) to receive a result set (step 408). In some embodiments, a portion of the operations pertaining to the herein disclosed techniques can be invoked responsive to issued database statements. One such set of operations is related to cursor generation, as described in FIG. 5.

Figure 5:
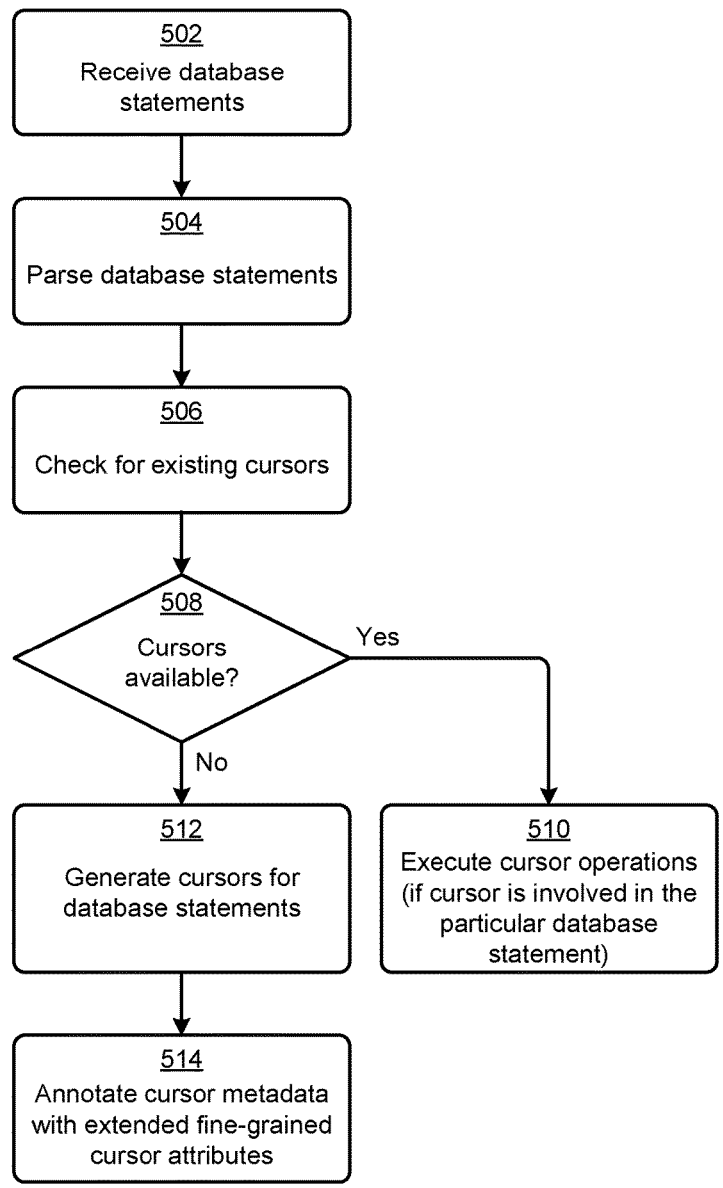
FIG. 5 presents a cursor generation technique as used to implement highly selective cursor invalidation based on fine-grained cursor attributes, according to some embodiments.

FIG. 5 presents a cursor generation technique 500 as used to implement highly selective cursor invalidation based on fine-grained cursor attributes. As an option, one or more variations of cursor generation technique 500 or any aspect thereof may be implemented in the context of the architecture and functionality of the embodiments described herein. The cursor generation technique 500 or any aspect thereof may be implemented in any environment.

FIG. 5 presents one embodiment of a set of steps and/or operations for generating cursors in systems implementing the herein disclosed techniques for highly selective cursor invalidation based on fine-grained cursor attributes. Specifically, the cursor generation technique 500 can commence with receiving one or more database statements (step 502). The received database statements can be parsed to determine various attributes associated with the database statement (step 504). For example, the parsed database statements can be checked (e.g., through parsing or through comparison to a known-good database statement) for compliant syntax and/or semantics. The parsed database statements can also be examined to detect whether the database statements relate to data definition (e.g., DDL statements) and/or data manipulation (e.g., DML, statements). If the parsed database statements are determined to be associated with data manipulation operations, the cursor generation technique 500 can perform a check for one or more cursors that match the data manipulation operations (step 506). If one or more cursors are available ("Yes" path of decision 508), the cursor operations associated with the selected cursors can be executed (step 510). If no cursors matching the data manipulation operations are discovered ("No" path of decision 508), one or more cursors for executing the data manipulation operations can be generated (step 512). For example, a query planner in a database system might process the data manipulation operations derived from the database statements to determine an optimal physical plan to execute on the database.

According to the herein disclosed techniques, a set of fine-grained cursor attributes can be annotated to the cursor metadata characterizing the generated cursors (step 514). As an example, each of the generated cursors might be described in part by the fine-grained cursor attributes 132 described in FIG. 3. In some cases, such annotation can occur at various times during the cursor generation and/or compilation process. For example, certain attributes associated with index cursors might be inserted during an allocation of the index row source. As another example, attributes associated with certain table or partition cursors might be inserted responsive to a semantic analysis of various statement components (e.g., partition expansion predicate).

Figure 6A:
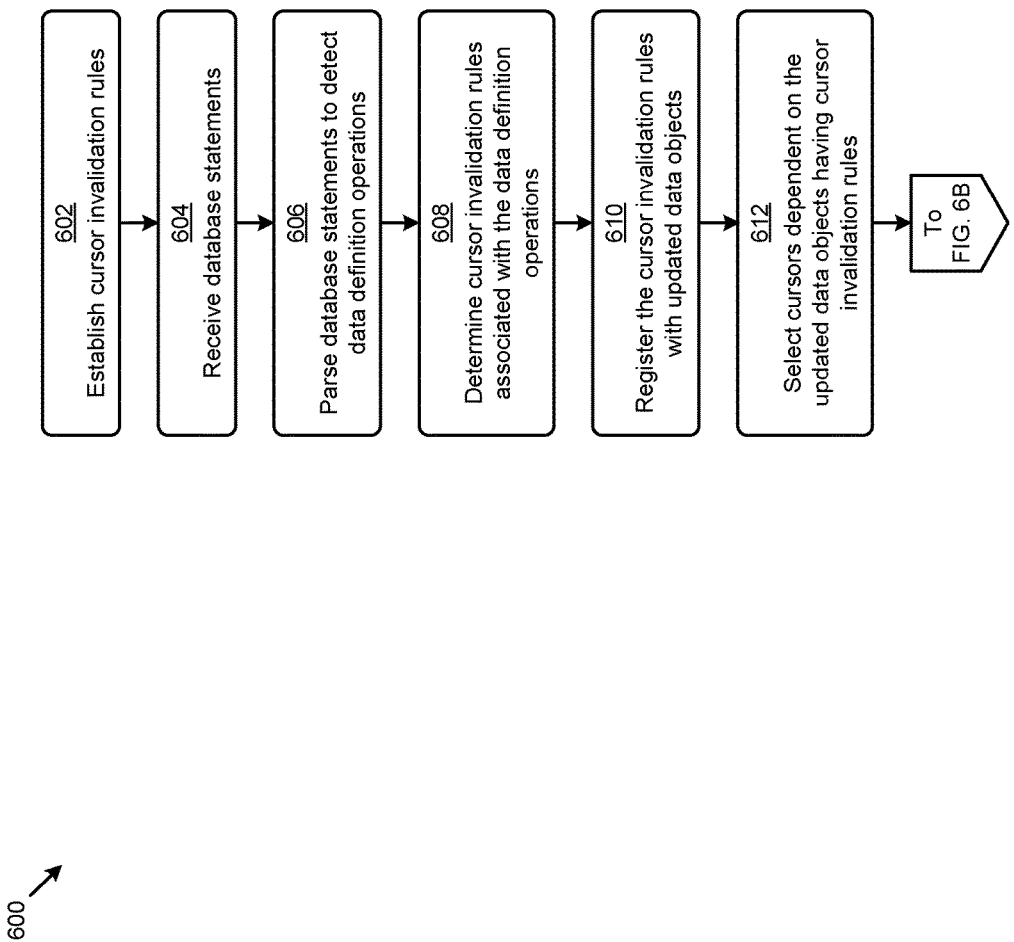
FIG. 6A and FIG. 6B present a selective cursor invalidation technique as used to implement highly selective cursor invalidation based on fine-grained cursor attributes, according to some embodiments.
Figure 6B:
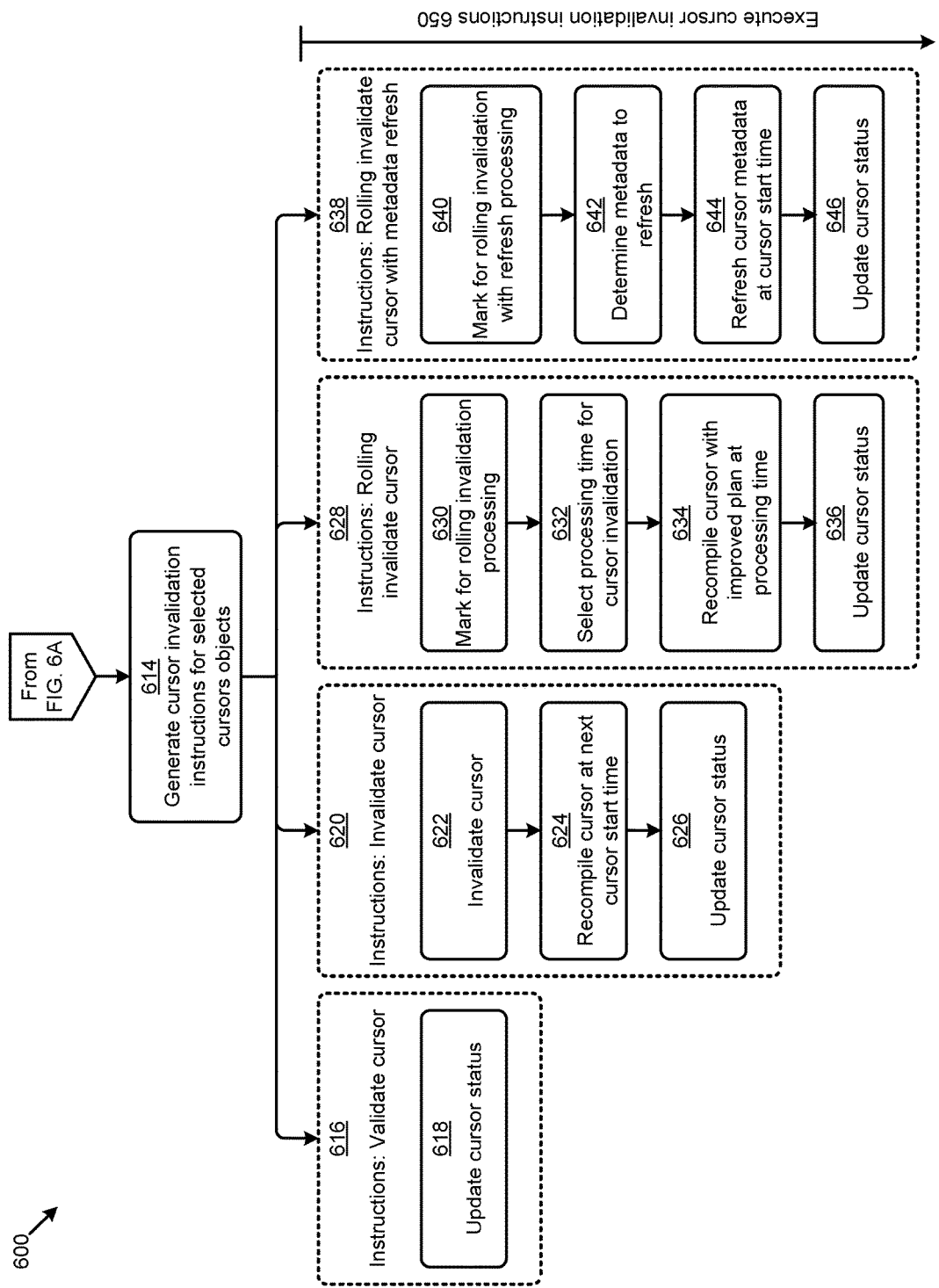

FIG. 6A and FIG. 6B present a selective cursor invalidation technique 600 as used to implement highly selective cursor invalidation based on fine-grained cursor attributes. As an option, one or more variations of selective cursor invalidation technique 600 or any aspect thereof may be implemented in the context of the architecture and functionality of the embodiments described herein. The selective cursor invalidation technique 600 or any aspect thereof may be implemented in any environment.

FIG. 6A presents one embodiment of a set of steps and/or operations for implementing the herein disclosed techniques for highly selective cursor invalidation based on fine-grained cursor attributes. Specifically, FIG. 6A illustrates that a set of cursor invalidation rules can be established (step 602). For example, such rules can be codified in various metadata stores, programming objects, and/or other components. A set of one or more database statements can be received (step 604) and parsed to detect data definition operations (step 606).

For example, the database statement might comprise various DDL statements associated with certain data definition operations. The detected data definition operations and rules serve to determine whether to invalidate the database cursor in entirety, or rather than invalidate the cursor in its entirety, to consider the occurrence of and values of cursor attributes so as to invalidate only a portion (or none) of the database cursor.

The established cursor invalidation rules can be scanned to determine a set of cursor invalidation rules associated with the detected data definition operations (step 608). For example, a set of rules might correspond to a DROP INDEX DDL statement and another set of rules might correspond to an INDEX BUILD DDL statement. In some embodiments, the identified rules associated with the data definition operations can be registered with the updated data objects that have been updated by the data definition operations (step 610). For example, a set of data object metadata for each updated data object in a data dictionary can be annotated with the cursor invalidation rules pertaining to the updated data object. Further, any cursors dependent on the updated data objects having registered cursor invalidation rules can be selected (step 612). Such selected cursor objects comprise the set of cursors to be analyzed for highly selective cursor invalidation as described herein.

Specifically, and referring to FIG. 6B, a set of cursor invalidation instructions can be generated for each of the selected cursor objects (step 614). For example, the cursor invalidation rules specific to the data definition operations can be applied to the fine-grained cursor attributes of each of the selected cursor objects to generate cursor invalidation instructions 140 for the selected cursor objects. As shown in FIG. 6B, various actions and/or instruction sets can result. Specifically, instructions to never invalidate cursor (grouping 616), instructions to always invalidate cursor (grouping 620), instructions to perform rolling invalidation of a cursor (grouping 628), instructions to rolling invalidate cursor with metadata refresh (grouping 638), and/or other actions and/or instruction sets are possible.

As shown, the steps and/or operations comprising each instruction set can be executed to carry out the cursor invalidation instructions generated for each of the selected cursor objects (see flow 650). For example, any of the selected cursor objects marked (e.g., in cursor metadata) for instructions to validate cursor might merely receive an update of a cursor status (step 618). Any of the selected cursor objects marked for instructions to invalidate cursor, can be invalidated (step 622). Further such invalidated cursors can be marked for recompile at the next cursor execution time or cursor start time (step 624). The status of the invalidated cursors can be updated (step 626).

Other selected cursor objects might be marked for processing to carry out instructions to rolling invalidate the cursor (step 630). For example, such cursors might be executable, but have a sub-optimal plan following a given database alteration. A processing time for performing certain operations pertaining to the cursor invalidation of each cursor can further be determined (step 632). For example, the processing time might be a selected later time (e.g., a future processing time) to provide a "rolling" effect to balance the resource consumption associated with cursor invalidation processing. At the determined processing time, the cursors can be recompiled with, for example, an improved plan (step 634). The status of the recompiled cursors can be updated (step 636).

Some selected cursor objects might be marked for processing to carry out instructions to rolling invalidate the cursor with a metadata update or refresh (step 640). For example, such cursors might be executable, but might require an update (e.g., refresh) of cursor metadata responsive to a given database alteration. The portion of metadata to refresh can be determined from the instructions and/or other information (step 642). For example, in some cases, a MOVE TABLE operation might precipitate an update of the segment metadata associated with the cursor object. In other cases, for example, a DROP PARTITION operation might precipitate an update of the partitioning extension metadata (e.g., partitioniterator). The identified metadata can then be refreshed at the next cursor start time (step 644). The status of the selected cursor objects with refreshed metadata can also be updated (step 646).

Additional Embodiments of the Disclosure

Additional Practical Application Examples

Figure 7:
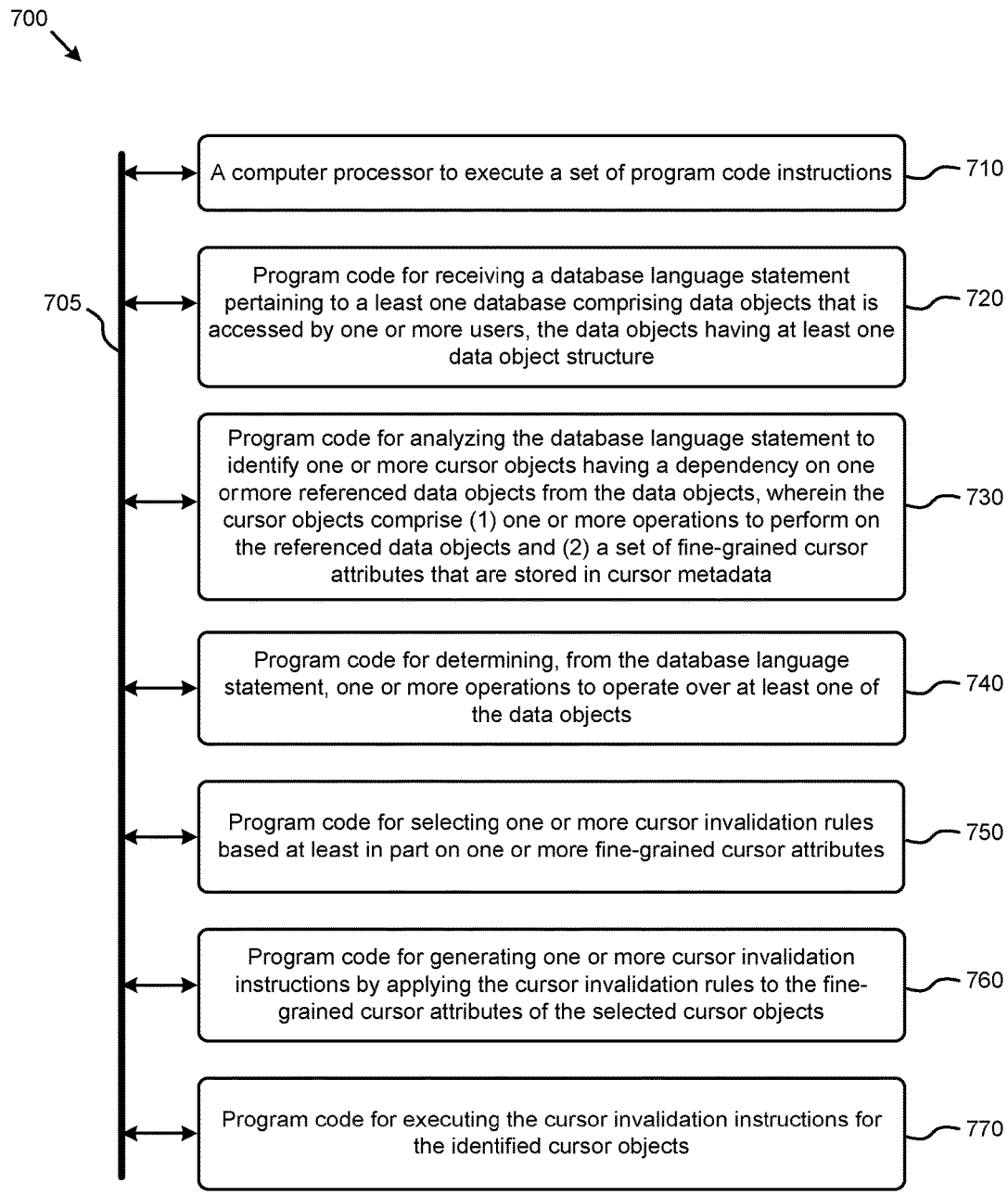
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (module 710) and modules for accessing memory to hold program code instructions to perform: receiving a database language statement pertaining to a least one database comprising data objects that is accessed by one or more users, the data objects having at least one data object structure (module 720); analyzing the database language statement to identify one or more cursor objects having a dependency on one or more referenced data objects from the data objects, where the cursor objects comprise one or more operations to perform on the referenced data objects, and a set of fine-grained cursor attributes that are stored in cursor metadata (module 730); determining, from the database language statement, one or more operations to operate over at least one of the data objects (module 740); selecting one or more cursor invalidation rules based at least in part on one or more of the fine-grained cursor attributes (module 750); generating one or more cursor invalidation instructions by applying the cursor invalidation rules to the fine-grained cursor attributes of the selected cursor objects (module 760); and executing the cursor invalidation instructions for the identified cursor objects (module 770).

Variations of the foregoing may include more or fewer of the shown modules and variations may perform more or fewer (or different) steps, and/or may use data elements in more, or in fewer, or different operations.

Some embodiments include variations that further comprise acts for detecting, from the database statement, one or more data manipulation operations to operate on the data objects, and acts for generating, responsive to detecting the data manipulation operations, at least one of the cursor objects.

Some embodiments include variations that further comprise acts for annotating the cursor metadata with the fine-grained cursor attributes corresponding to the at least one of the cursor objects.

Some embodiments include variations that further comprise acts for registering the cursor invalidation rules in a respective portion of data object metadata corresponding to updated data objects.

Some embodiments include variations where the fine-grained cursor attributes comprise at least one of, one or more dependency attributes, or one or more segment attributes, or one or more partitioning attributes, or one or more statistics attributes, or one or more cursor rules attributes, or any combination thereto.

Some embodiments include variations where the cursor invalidation instructions serve to update a cursor status of at least one of the selected cursor objects.

Some embodiments include variations where the cursor invalidation instructions serve to invalidate at least one of the selected cursor objects.

Some embodiments include variations where the cursor invalidation instructions serve to schedule a rolling invalidation of at least one of the selected cursor objects.

Some embodiments include variations where the rolling invalidation comprises recompiling the at least one of the selected cursor objects at a future processing time.

Some embodiments include variations where the rolling invalidation comprising updating at least a portion of the cursor metadata at a future processing time; and some embodiments include variations where the processing time is at least one of, a randomly selected time, or a cursor start time, the cursor start time corresponding to an execution of the at least one of the selected cursor objects.

System Architecture Overview

Additional System Architecture Examples

Figure 8:
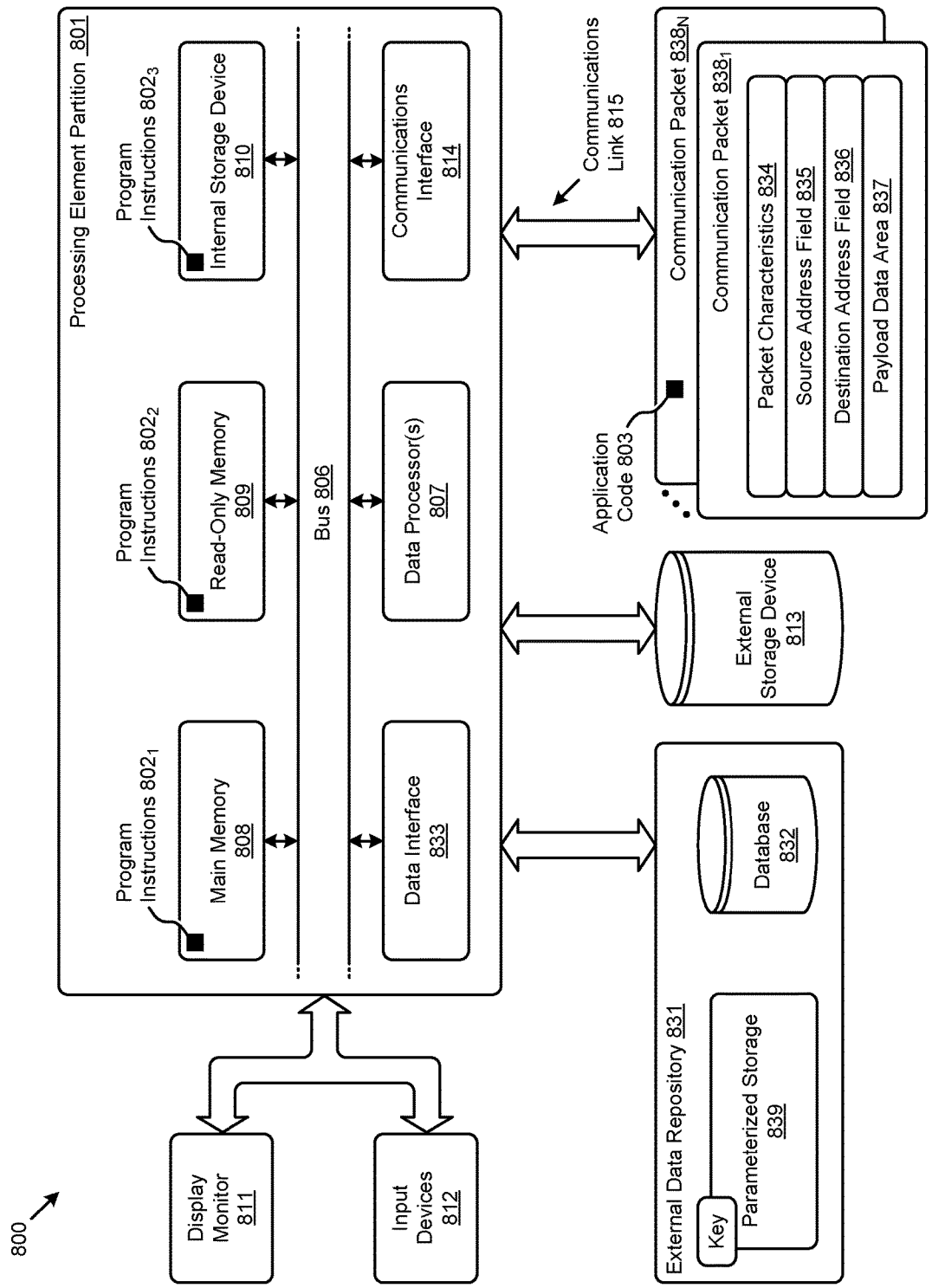
FIG. 8 depicts exemplary architectures of components suitable for implementing embodiments of the present disclosure and/or for use in the herein-described environments.

FIG. 8 depicts a block diagram of an instance of a computer system 800 suitable for implementing embodiments of the present disclosure. Computer system 800 includes a bus 806 or other communication mechanism for communicating information. The bus interconnects subsystems and devices such as a CPU, or a multi-core CPU (e.g., data processors 807), a system memory (e.g., main memory 808, or an area of random access memory), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 800 further comprises a display 811 (e.g., CRT or LCD), various input devices 812 (e.g., keyboard, cursor control), and an external data repository 831.

According to an embodiment of the disclosure, computer system 800 performs specific operations by data processors 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 800 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access (DMA), etc.) by devices such as data processors 807.

The communications link 815 can be configured to transmit (e.g., send, receive, signal, etc.) any types of communications packets (e.g., communications packet $838_1$, ..., communications packet $838_N$) comprising any organization of data items. The data items can comprise a payload data area 837, a destination address field 836 (e.g., a destination IP address), a source address field 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processors 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 800. According to certain embodiments of the disclosure, two or more instances of computer system 800 coupled by a communications link 815 (e.g., LAN, PTSN, or wireless network) may perform the sequence of instructions required to practice embodiments of the disclosure using two or more instances of components of computer system 800.

The computer system 800 may transmit and receive messages such as data and/or instructions organized into a data structure (e.g., communications packets). The data structure can include program instructions (e.g., application code 803), communicated through communications link 815 and communications interface 814. Received program code may be executed by data processors 807 as it is received and/or stored in the shown storage device, or in or upon any other non-volatile storage for later execution. Computer system 800 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of systems that perform automatic overrides of database statistics gathering commands.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing automatic overrides of database statistics gathering commands). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method, comprising:
receiving a plurality of database language statements pertaining to a first database-object in a database, wherein the plurality of database language statements comprises a first database statement and a second database statement, the first database statement performs a first data manipulation language (DML) operation and the second database statement performs a second DML operation against the first database object;
determining a first database cursor corresponding to the first database statement;
determining a second database cursor corresponding to the second database statement;
determining a respective set of cursor attributes that is associated with each of the first and second database cursors;
receiving and executing a data definition language (DDL) statement on the first database object or a second database object related to the first database object; and
determining whether or not to perform cursor invalidation based at least in part on the DDL statement and at least one cursor attribute of the set of cursor attributes, at least by:
invalidating the first database cursor corresponding to the first database language statement based at least in part upon the DDL statement and at least a first cursor attribute pertaining to the first database cursor; and
maintaining the second database cursor corresponding to the second database language statement without invalidation based at least in part upon the DDL statement and at least a second cursor attribute pertaining to the second database database cursor.

2. The computer-implemented method of claim 1, further comprising analyzing the second database language statement to identify a portion of the database cursor that is not invalidated based in whole or in part on the set of cursor attributes.

3. The computer-implemented method of claim 2, wherein the DDL statement comprises a database language clause pertaining to at least one of an index to be dropped or a dropped index.

4. The computer-implemented method of claim 1, further comprising analyzing the DDL statement to identify a portion of the first database cursor for which invalidation is deferred to a future processing time.

5. The computer-implemented method of claim 1, further comprising:

associating the first or second database cursor with cursor objects comprising one or more of the set of cursor attributes that correspond to the first or second database cursor; and
performing a rolling invalidation on a third database cursor corresponding to a third database language statement based at least in part upon the DDL statement and at least a third cursor attribute pertaining to the third database cursor.

6. The computer-implemented method of claim 5, wherein the set of cursor attributes comprise at least one of one or more dependency attributes, or one or more segment attributes, or one or more partitioning attributes, or one or more statistics attributes, or one or more cursor rules attributes, or any combination thereof.

7. The computer-implemented method of claim 6, further comprising registering a set of cursor invalidation instructions as metadata corresponding to one or more updated database objects that are updated by an execution of the DDL statement.

8. The computer-implemented method of claim 7, wherein the set of cursor invalidation instructions serves to update a cursor status of the first or second database cursor based in whole or in part on one or more of the set of cursor attributes.

9. The computer-implemented method of claim 7, wherein the set of cursor invalidation instructions serves to invalidate fewer than all of the cursor objects that correspond to the first or second database cursor.

10. The computer-implemented method of claim 7, wherein the set of cursor invalidation instructions serves to schedule a rolling invalidation of at least one of the cursor objects, and the rolling invalidation comprises recompiling the at least one of the cursor objects at a future processing time.

11. The computer-implemented method of claim 1, wherein the act of determining whether or not to perform the cursor invalidation is further based at least in part upon one or more invalidation rules that comprise one or more operators pertaining to one or more database statement types and one or more types of database operations.

12. A non-transitory computer readable medium having stored thereon a sequence of instructions which, when stored in memory and executed by one or more processors causes the one or more processors to perform a set of acts the acts comprising:
receiving a plurality of database language statements pertaining to a first database object in a database, wherein the plurality of database language statements comprises a first database statement and a second database statement, the first database statement performs a first data manipulation language (DML) operation and the second database statement performs a second DML operation against the first database object;
determining a first database cursor corresponding to the first database statement;
determining a second database cursor corresponding to the second database statement;
determining a respective set of cursor attributes that is associated with each of the first and second database cursors;
receiving and executing a data definition language (DDL) statement on the first database object or a second database object related to the first database object; and determining whether or not to perform cursor invalidation based at least in part on the DDL statement and at least one cursor attribute of the set of cursor attributes, at least by:

invalidating the first database cursor corresponding to the first database language statement based at least in part upon the DDL statement and at least a first cursor attribute pertaining to the first database cursor; and maintaining the second database cursor corresponding to the second database language statement without invalidation based at least in part upon the DDL statement and at least a second cursor attribute pertaining to the second DB cursor.

13. The non-transitory computer readable medium of claim 12, further comprising instructions which, when stored in the memory and executed by the one or more processors, cause the one or more processors to perform acts of analyzing the second database language statement to identify a portion of the database cursor that is not invalidated based at least in part on the set of cursor attributes.

14. The non-transitory computer readable medium of claim 13, wherein the DDL statement comprises a database language clause pertaining to at least one of an index to be dropped or a dropped index.

15. The non-transitory computer readable medium of claim 12, further comprising instructions which, when stored in the memory and executed by the one or more processors, cause the one or more processors to perform acts of analyzing the DDL statement to identify a portion of the first database cursor for which invalidation is deferred to a future processing time.

16. The non-transitory computer readable medium of claim 12, further comprising instructions which, when stored in the memory and executed by the one or more processors, cause the one or more processors to perform acts of associating the first or second database cursor with cursor objects comprising one or more of the set of cursor attributes that correspond to the first or second database cursor.

17. The non-transitory computer readable medium of claim 16, wherein the set of cursor attributes comprises at least one of one or more dependency attributes, or one or more segment attributes, or one or more partitioning attributes, or one or more statistics attributes, or one or more cursor rules attributes, or any combination thereof.

18. The non-transitory computer readable medium of claim 17, further comprising instructions which, when stored in the memory and executed by the one or more processors, cause the one or more processors to perform acts of registering a set of cursor invalidation instructions as metadata corresponding to one or more updated database objects.

19. A system, comprising:
a storage medium having stored thereon a sequence of instructions; and
one or more processors that execute the instructions to cause the one or more processors to perform a set of acts, the set of acts comprising;

receiving a plurality of database language statement pertaining to a first database object in a database, wherein the plurality of database language statements comprises a first database statement and a second database statement, the first database statement performs a first data manipulation language (DML) operation and the second database statement performs a second DML operation against the first database object;

determining a first database cursor corresponding to the first database statement;

determining a second database cursor corresponding to the second database statement;

determining a respective set of cursor attributes that is associated with each of the first and second database cursors;

receiving and executing a data definition language (DDL) statement on the first database object or a second database object related to the first database object; and determining whether or not to perform cursor invalidation based at least in part on the DDL statement and at least one cursor attribute of the set of cursor attributes, at least by:

invalidating the first database cursor corresponding to the first database language statement based at least in part upon the DDL statement and at least a first cursor attribute pertaining to the first database cursor; and maintaining the second database cursor corresponding to the second database language statement without invalidation based at least in part upon the DDL statement and at least a second cursor attribute pertaining to the second database cursor.

20. The system of claim 19, further comprising a memory to hold instructions to cause the one or more processors to perform acts of analyzing the DDL statement to identify a portion of the second database cursor that is not invalidated based on the set of cursor attributes.

* * * * *